United States Patent [19]

Marsh et al.

[11] 4,391,454

[45] Jul. 5, 1983

[54] UTILITY CART WITH DETACHABLE AND REVERSIBLE SHELVES

[76] Inventors: Douglas D. Marsh, 1212 Mark Dr.; Arthur E. Feldman, 108 Iwo St.; John C. Newlin, R.R. #3, all of Auburn, Ind. 46706

[21] Appl. No.: 137,388

[22] Filed: Apr. 4, 1980

[51] Int. Cl.³ .............................................. B62B 11/00
[52] U.S. Cl. ................................... 280/47.35; 108/62; 211/186; 280/79.1 A; 403/231
[58] Field of Search .......... 280/47.35, 79.1 R, 79.1 A, 280/79.2, 79.3; 211/133, 135, 186, 187, 182, 42; 108/12, 13, 62; 312/233, 250; 403/231; D12/30

[56] References Cited

U.S. PATENT DOCUMENTS

| 1,854,777 | 4/1932 | Bales | 280/79.3 X |
|---|---|---|---|
| 3,575,440 | 4/1971 | Lay | 280/79.3 |
| 3,967,908 | 6/1976 | Snow | 403/231 X |
| 4,093,167 | 6/1978 | Rooklyn | 403/231 X |

FOREIGN PATENT DOCUMENTS

| 633838 | 1/1962 | Canada | 280/47.35 |
|---|---|---|---|
| 1037453 | 7/1966 | United Kingdom | 280/47.35 |

OTHER PUBLICATIONS

Brochure of Garrett Tubular Products, Inc. showing U.S. Pat. No. De. 196,570, D12/30, Garrett, Ind. 46738.

*Primary Examiner*—Joseph F. Peters, Jr.
*Assistant Examiner*—Donald W. Underwood
*Attorney, Agent, or Firm*—George A. Gust

[57] ABSTRACT

A utility cart having detachable and reversible shelves comprising a pair of end frames each having a pair of elongated rigidly connected upright hollow supports which are parallel and spaced apart. A horizontal orthogonal shelf device is detachably secured at the corners to said upright supports. One shelf device includes a flat bottom and two transverse flanges on opposite parallel side edges to provide a partial closure, the opposite ends being open. A mounting bracket is secured to each end of each flange and has an attaching portion projecting angularly inwardly. Each attaching portion engages the respective upright support at a point within the angle defined by the shelf corner. Each support is further provided at such engagement point with a threaded opening through one wall thereof. A screw is received through an opening in each bracket and is threaded into the threaded opening for securing the shelf device to the upright supports.

A different shelf device may be formed in two portions with a median wall portion upstanding from the bottom against which books may be arranged.

4 Claims, 14 Drawing Figures

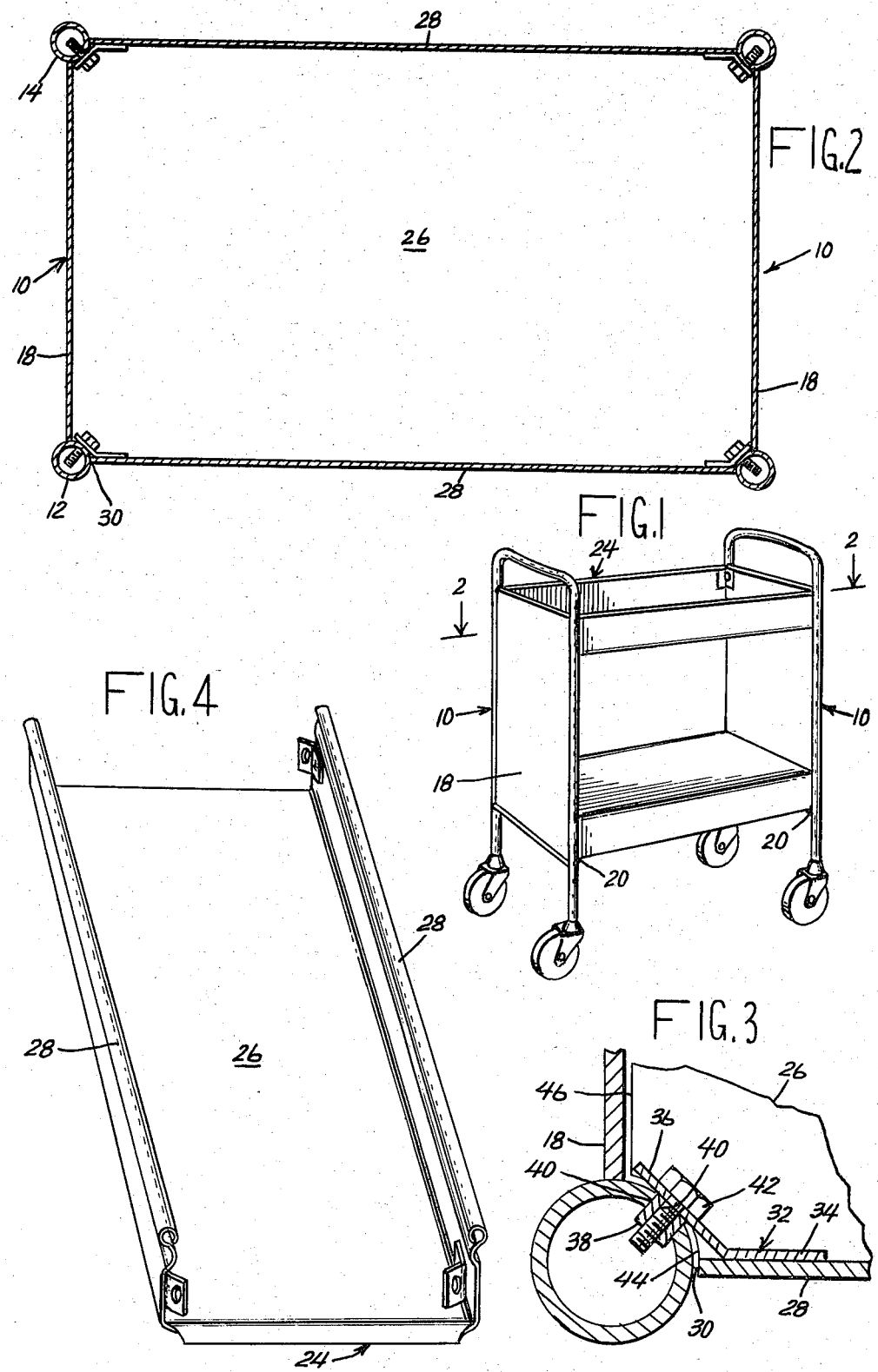

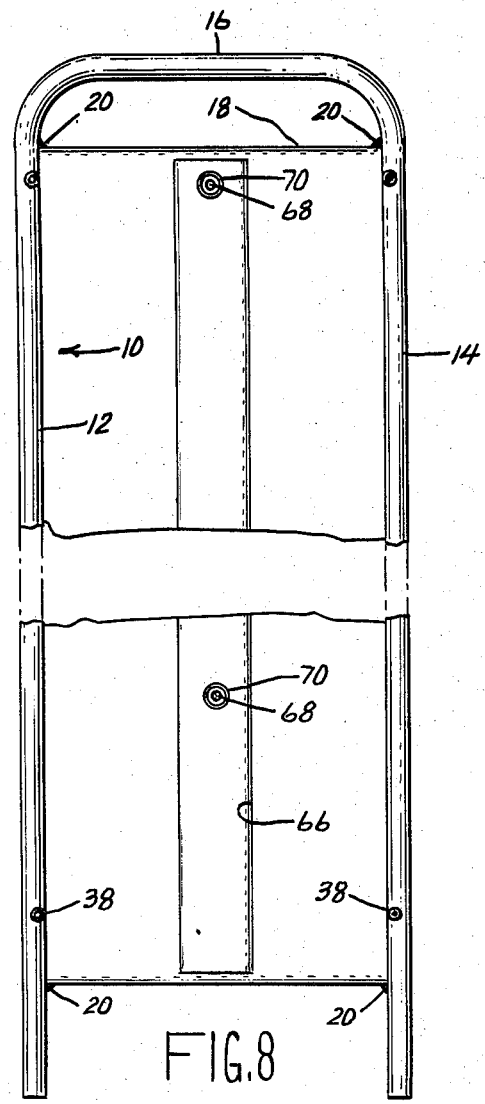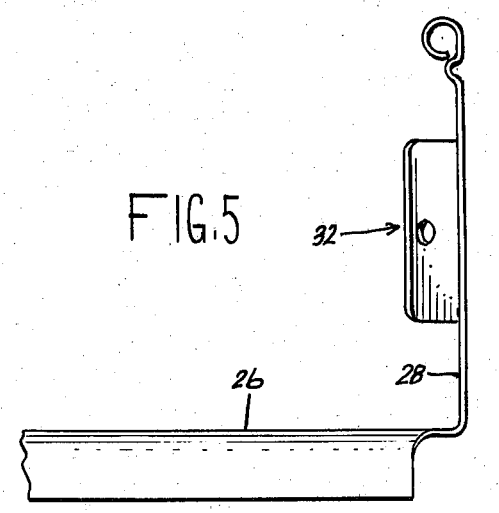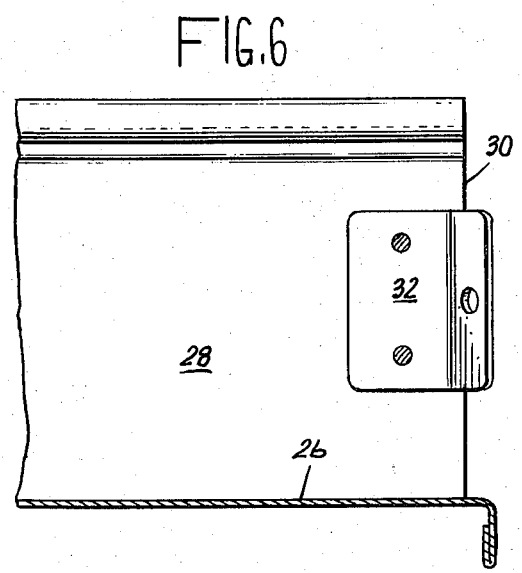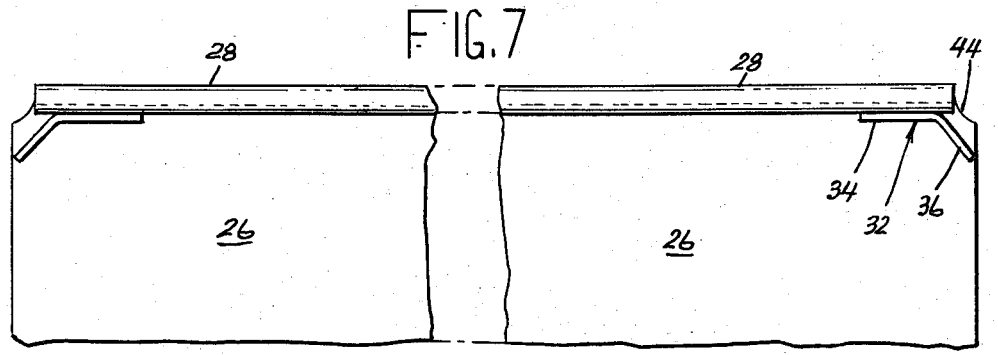

UTILITY CART WITH DETACHABLE AND REVERSIBLE SHELVES

BACKGROUND OF THE INVENTION

1. Field of the Invention

The present invention relates to utility carts and more particularly to such carts having detachable shelves.

2. Description of the Prior Art

Utility carts are well known and conventionally include an orthogonal upright supporting frame composed of tubular steel upright supports at the corners. Horizontal shelves of orthogonal shape extend between the upright supports and conventionally are secured thereto by means of threaded fasteners passing diametrically through the supports. The fastening means are so arranged that the shelves can be secured in only one position. By reason of the threaded fasteners passing through the tubular supports, excessive tightening thereof has resulted in some flattening of the supports which limits tightness and is also the cause of the fasteners becoming loose after a period of time.

SUMMARY OF THE INVENTION

This invention relates to a utility cart having detachable and reversible shelves comprising a pair of end frames each having a pair of elongated rigidly connected upright hollow supports which are parallel and spaced apart. A horizontal orthogonal shelf device is detachably secured at the corners to said upright supports. Each shelf device includes a flat bottom and two transverse flanges on opposite parallel side edges thereof to provide a partial closure. The opposite ends of the shelf device are open. A mounting bracket is secured to each end of each flange and has an attaching portion projecting angularly inwardly. Each attaching portion engages the respective upright support at a point within the angle defined by the shelf corners. Each support is provided at the engagement point thereon with a threaded opening through one wall thereof, a threaded fastener being received through an opening in the attaching device and being threaded into the threaded opening for securing the shelf device to the upright supports. The flanges are so arranged as to extend between the pair of end frames and the shelf device can be secured in either of two positions, with the flanges extending upwardly or downwardly. The shelf device may include an upstanding, median wall portion which serves as a back against which books on the like may be arranged.

It is an object of this invention to provide a utility cart having detachable shelves.

The above-mentioned and other features and objects of this invention and the manner of attaining them will become more apparent and the invention itself will be best understood by reference to the following description of an embodiment of the invention taken in conjunction with the accompany drawings.

In the drawings

FIG. 1 is a perspective illustration of one embodiment of this invention;

FIG. 2 is a cross section taken substantially along section line 2—2 of FIG. 1;

FIG. 3 is a cross section similar to FIG. 2 but of only a corner portion thereof;

FIG. 4 is a perspective view of one of the shelves;

FIG. 5 is a partial end view of the shelf of FIG. 4;

FIG. 6 is a longitudinal sectional view of the shelf showing the attaching brackets mounted on the ends of one of the shelf flanges;

FIG. 7 is a fragmentary plan view of the shelf;

FIG. 8 is an elevation of the inner side of one of the end frames of the utility cart;

Figure 9:
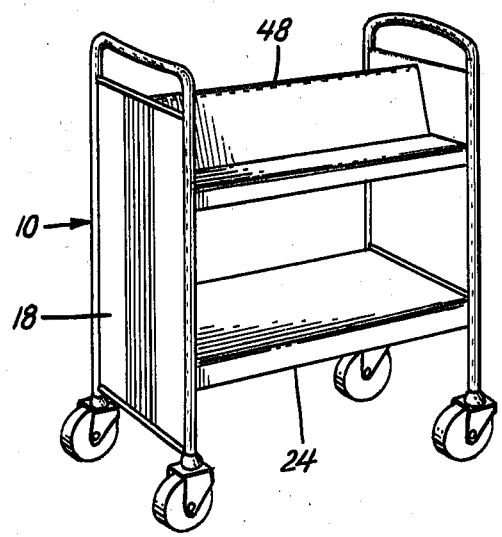
FIG. 9 is a perspective view of another embodiment of this invention in which a slanted shelf device is used in place of a flat shelf or tray.

Referring to the drawings, the utility cart includes two identically formed end frames 10 of all welded unit construction of tubular steel tubing. The tubing is formed into a U-shape to provide for upright spaced apart and parallel supports 12 and 14 connected together by a transverse portion 16. A sheet metal panel 18 extends between the uprights 12 and 14 and is welded thereto at the corners indicated by the numeral 20. As shown more clearly in FIGS. 2 and 3, the panel 18 engages the uprights 12 and 14 at about the midportion thereof. Caster wheels 22 may be mounted on the bottom ends of the supports 12 and 14.

Secured to the end frame 10 are two horizontal shelf devices indicated generally by the numeral 24. These shelf devices 24 are rectangularly shaped with the corners thereof being secured to the respective uprights 12, 14. More particularly, the shelf devices are each formed of sheet metal with a flat bottom 26 and two parallel side flanges 28 which, with the bottom 26, form a partial enclosure. This shelf device 24 thus has the opposite ends open as shown in FIG. 4.

As shown more clearly in FIGS. 4 and 5, each flange 28 extends at right angles to the bottom 26 and has opposite end edges 30 which also extend at right angles to the bottom 26. The length of flanges 28 is slightly less than that of the bottom 26 as shown in FIGS. 6 and 7.

Four attaching brackets 32 are secured to the opposite ends, respectively, of the flanges 28, each of the brackets 32 having a flat mounting portion 34 and a flat attaching portion 36. The mounting portion 34 lies flat against the inner side of the respective flange 28 and is spot-welded thereto in the positions shown in the various figures. The attaching portion 36 extends at an obtuse angle with respect to the mounting portion 34 as well as the respective flange 28, this attaching portion 36 actually extending beyond the respective end 30 of the flange 28.

Each shelf device 24 is detachably mounted on the end frames 10 as appears in FIGS. 2 and 3. Each upright 12 has an internally threaded sleeve 38 press fitted, swaged, or otherwise secured within an opening 40 in the wall of the upright 12, 14 in such a position that the axis thereof defines a 45 degree angle with the intersection of the respective flanges 28 and end panels 18. The attaching portion 36 of the bracket 32 engages the respective upright 12, 14 substantially tangentially at about the axis of the threaded insert 38. Preferably, with the attaching portion 36 of the bracket 32 forming an angle of about 135° with the mounting portion 34, this tangential engagement will substantially coincide with the threaded insert 38.

The attaching portion 36 of the bracket 32 is provided with an opening 40 in line with the threaded opening of the insert 38, a threaded fastener 42 being received by this opening 40 and threaded into the insert 38. Upon tightening the threaded fasteners 42 at all of the uprights 12, 14 the shelf device will be rigidly secured thereto.

Further noting FIGS. 3 and 7, the corners of the bottom 36 are recessed as indicated by the numeral 44. This provides adequate clearance as shown in FIG. 3 with the uprights 12, 14 so that the attaching portions 36 of the brackets 32 can firmly engage the respective uprights 12, 14 thereby to secure rigidly the shelf device 24 thereto.

Additionally, referring to FIG. 3, it will be noted that the ends of the bottom 26 as indicated by the numeral 46 are so dimensioned as to just engage the respective end panels 18 such that the shelf 26 will extend substantially therebetween. This avoids any unsightly cracks or gaps.

As shown in FIG. 1, the shelf devices 24 are so mounted that the flanges 28 extend upwardly from the bottom 26 thereby providing a tray-like structure. If desired, either or both of the shelf devices 24 may be disassembled by removing the threaded fasteners 42, turned over with the flanges 28 extending downwardly and then remounted on the uprights by reinserting the fasteners 42 as previously described. The shelf devices 24 are thus not only detachable but are reversible.

The particular arrangement for detachably mounting the shelf device on the uprights is advantageous for the reason that once the threaded fasteners 42 are tightly turned into place, there is little chance of loosening. Furthermore, the fasteners 42 can be tightened as much as desired within the limitations of the fastener itself. In prior art arrangements, screws with nuts were used, which passed completely through the tubular upright for securing the shelf in place such that if the screw were tightened too tightly, it would tend to flatten the upright. This resulted in limiting the degree to which the screw could be tightened and furthermore after a period of time could result in the screw loosening by reason of the upright yielding under the transverse compressing force applied thereto.

In this invention, the insert 38 is provided in one wall only of the upright such that upon tightening the screw 42, there is no compressing force applied to the upright.

By reason of the particular angular arrangement of the various attaching brackets, reverse mounting of the shelves is facilitated without altering in any way the attractiveness or sturdiness of the structure.

A different embodiment of this invention is shown in the FIGS. 9 through 13. Like numerals indicate like parts. Referring first to FIG. 9, the cart there shown is substantially like that of FIG. 1 with the exception that instead of using one shelf device 24, a book shelf 48 is used. This book shelf 48 may be detachably mounted on the end frames 10 in the same manner as the reversible shelves 24. the book shelf 48 as shown in more detail in FIGS. 11 and 12 and includes two sloping substantially horizontal bottom portions 26a and 26b having edge flanges 28a like flanges 28 used on the reversible shelves 24. Brackets 32 are mounted on the opposite ends of the flanges 28a as previously described, and upstanding between the two bottom portions 26a and 26b is a wall portion 50 formed with an inverted V-shaped. The bottom panel portions 26a and 26b are upwardly bent to provide the wall panels 52 which are joined in an apex portion 54 smoothly radiused as shown. The two wall panels 52 are at right angles to the bottom panel portions 26a and 26b, the latter being slightly sloped as shown. Books may therefore be arranged on the shelf in upright position against the wall panels 52 without falling or sliding therefrom.

Further, right angle, reinforcing flanges 56 are formed on the opposite end edges of the bottom panel portion 26a and 26b and like flanges 58 are formed on the end edges of the wall panels 52. The shelf 48 preferably is formed of a single piece of sheet metal bent to provide the various parts shown and described.

Figure 11:
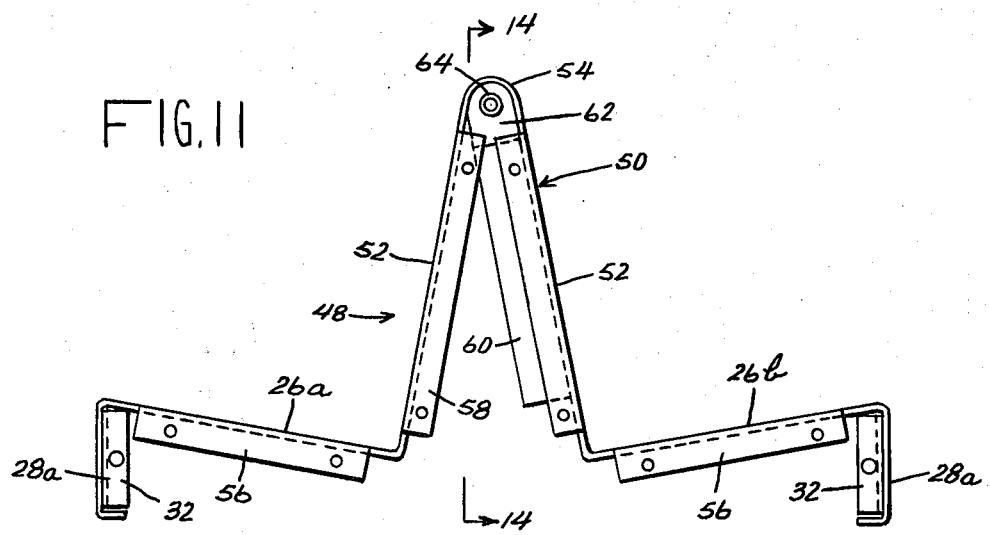
FIG. 11 is an end view of the book shelf.
Figure 12:
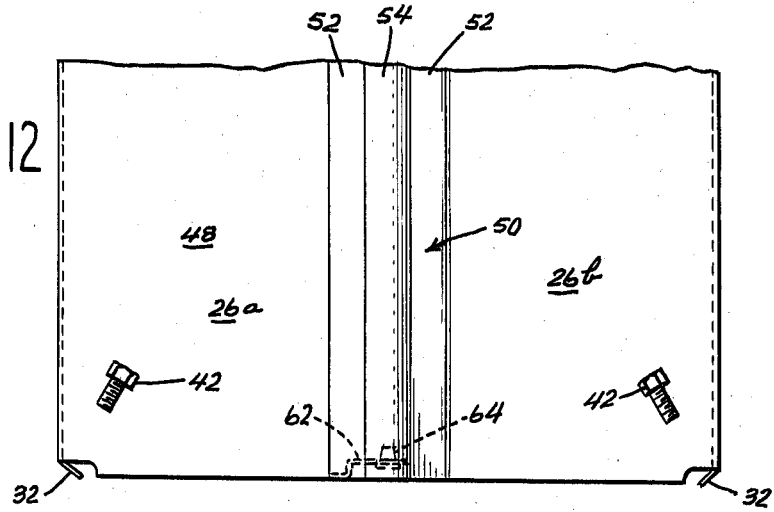
FIG. 12 is fragmentary top view thereof.
Figure 13:
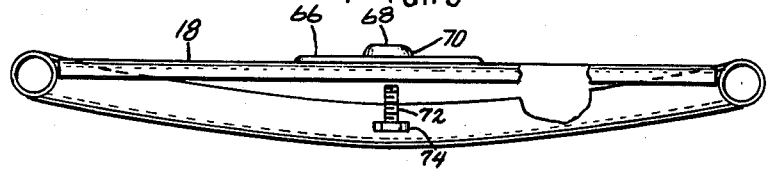
FIG. 13 is a top view of one of the end frames.
Figure 14:
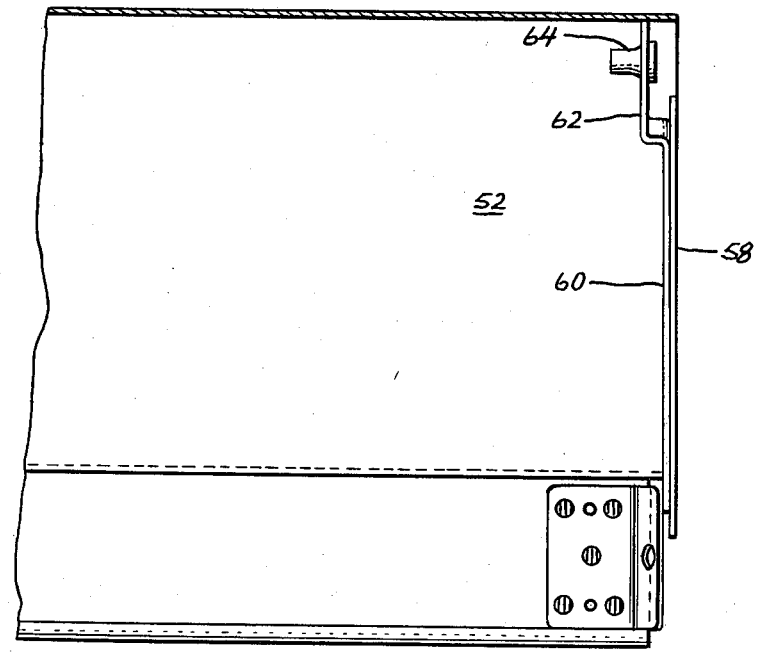
FIG. 14 is a cross section taken substantially along section line 14—14 of FIG. 11.

Two elongated flat metal brackets 60 are welded to the inner surfaces of corresponding flanges 58 on the opposite ends of one of the wall panels 52 (only one bracket 60 being shown). As shown more clearly in FIG. 14, bracket 60 has an offset portion 62 on one end which fits into the apex portion 54 of the wall 50, a threaded nut element 64 like the threaded insert 38 being secured within an opening in this offset portion 62. The upper end of the offset portion 62 is rounded so as to fit the corresponding surface of the apex portion 54 (FIG. 11). Further, the portion 62 is disposed inwardly from the end of wall 50. Referring to FIGS. 8 and 13, it will be seen that the end panel 18 is provided with an elongated, flat indentation 66 in the mid portion thereof, this indentation being provided with two mounting holes 68 in circular embossments or countersinks 70.

The shelf device 48 is mounted on the end frames 10 the same as the reversible shelves 24, threaded fasteners 42 being used for this purpose. In addition, threaded fasteners 72 (FIG. 13), having heads 74 are received by the openings 68 in the end panels 18 to be threadedly received by the inserts 64 in the brackets 60, respectively. The countersunk indentations 70 are made to such size as to receive heads 74 therein flush with the surface of the panel indentations 66. Upon tightening, the threaded fasteners 72 secure the wall portion 50 to the opposite end frames 10.

Figure 10:
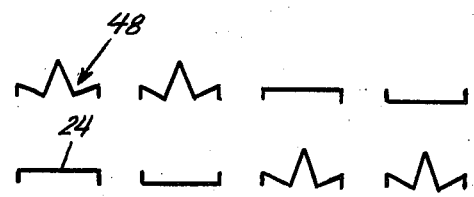
FIG. 10 is a diagramatic illustration showing different arrangements of book and tray shelves with may be assembled to the cart.

FIG. 10 diagramatically illustrates four different possible arrangements of the shelf devices 24 and 48, in two of these the book shelves 48 being uppermost and the shelves 24 being shown with the flanges 28 projecting upwardly and downwardly, respectively. Since the structure for fastening the shelf devices to the end frames is the same, shelf devices 24 may be substituted for the book shelves 48.

The panel indentations 66 serve two purposes, one in reinforcing the panel 18 and the other to provide a space for receiving a decorative strip of flexible material, such as vinyl, having pressure sensitive adhesive on one side, such a strip (not shown) being of the same size as the indentations 66 so as to fit snuggly therein and to cover the heads 74 of the threaded fasteners 72. The thickness of the strip is made to be substantially equal to the depth of the indentations 66 such that the finished surface of the panel 18 is flush.

While there have been described above the principles of this invention in connection with specific apparatus, it is to be clearly understood that this description is made only by way of example and not as a limitation to the scope of the invention.

What is claimed is:

1. A utility cart having reversible shelves comprising a pair of end frames, each having a pair of elongated rigidly connected upright hollow supports which are parallel and spaced apart, each end frame having an end panel secured to said upright supports, an orthogonal shelf device detachably secured at the corners to said upright supports: said shelf device including two parallel flanges on opposite side edges and being essentially open at the opposite ends thereof, one mounting bracket secured to each end of each flange and having an attaching portion projecting angularly inwardly, each attaching portion engaging the respective upright support at a point within the angle defined by the shelf corners; each support having at said engagement point a threaded opening through one side thereof, and one fastener received by an opening in each attaching portion and being threaded into said threaded opening for securing said shelf device to said upright supports, said flanges extending between said pair of end frames and said panels being juxtaposed with the opposite ends of said shelf device thereby serving as end closures therefor, said shelf device also having a bottom formed with two portions angling downwardly from said two flanges, respectively, and an upstanding inverted V-shaped wall portion connected at the lower edges to the inner facing edges of said two bottom portions, respectively, said wall portion including two back panels and being provided at each end of one back panel thereof with an elongated plate like bracket which generally lies in a plane at right angles to said one back panel, each said bracket extending into the apex portion of said wall portion and having an opening for receiving a fastener, and a fastener extending through an opening in each end panel and into each said bracket opening for supporting said wall portion with respect to said end frame.

2. The cart of claim 1 wherein said end panels have flat indentations therein in which said openings are disposed, said indentations being counter-sunk about the apertures therein, and each said fastener is threaded and provided with a head, each said head being received within the countersink and each fastener being threadly received by said bracket opening.

3. The cart of claim 1 wherein the opposite end edges of said bottom and wall portions have reinforcing flanges, each said bracket being welded to one of said end flanges on a wall panel.

4. The cart of claim 1 wherein each said opening is formed in a stepped portion on the end of said bracket which fits into said apex portion, said stepped portion being inset from the end of said wall portion.

* * * * *